United States Patent [19]
Tanaka

[11] Patent Number: 5,363,438
[45] Date of Patent: Nov. 8, 1994

[54] SELECTIVE RINGING RECEIVING DEVICE AND METHOD

[75] Inventor: Yasunari Tanaka, Yokohama, Japan

[73] Assignee: Matsushita Electric Industrial Co., Ltd., Osaka, Japan

[21] Appl. No.: 787,111

[22] Filed: Nov. 4, 1991

[30] Foreign Application Priority Data

Nov. 9, 1990 [JP] Japan .................................. 2-305141

[51] Int. Cl.$^5$ .............................................. H04L 7/06
[52] U.S. Cl. .................................... 379/375; 379/372; 379/373; 375/111
[58] Field of Search ................ 379/372, 373, 375, 418; 375/108, 109, 111, 113, 114

[56] References Cited

U.S. PATENT DOCUMENTS

| | | | |
|---|---|---|---|
| 3,995,111 | 11/1976 | Tsuji et al. | 375/109 |
| 4,466,111 | 8/1984 | Bennett | 375/111 |
| 4,472,811 | 9/1984 | Froggatt | 375/111 |
| 4,782,499 | 11/1988 | Clendening | 375/111 |
| 5,175,544 | 12/1992 | McKeen | 375/111 |

FOREIGN PATENT DOCUMENTS 0100038  5/1986  Japan .................................. 375/111

Primary Examiner—James L. Dwyer
Assistant Examiner—M. W. Shehata
Attorney, Agent, or Firm—Stevens, Davis, Miller & Mosher

[57] ABSTRACT

A selective ringing receiving circuit comprises a timing generating circuit for generating a timing signal for bit length comparison, a bit length comparison circuit for comparing, in terms of the timing signal, the respective bit lengths of '1' and '0' of a received digital signal outputted in a direct conversion system when a selective ringing signal is received from a base station, thereby producing a changing point detection/selection signal, a changing point detection circuit for selecting the rising and falling changing points of the received signal using the changing point detection/selection signal to produce a detected rising or falling changing point signal of the received digital signal, and a bit synchronization circuit for performing bit synchronization in response to the detected changing point inputted. Thus, even if the outputting frequency of the receiving station or the transmission frequency in the base station fluctuates, normal bit synchronization for the received digital signal can be made.

9 Claims, 4 Drawing Sheets

SELECTIVE RINGING RECEIVING DEVICE AND METHOD

BACKGROUND OF THE INVENTION

The present invention relates to a selective ringing receiving device and method used for bit synchronization in a direct conversion system.

Conventionally, in such a kind of selective ringing receiving device, with respect to the digital signal received by a double superheterodyne system or single superheterodyne system, its changing point for bit synchronization was uniquely set for a rising changing point, a falling changing point or both rising changing points.

The conventional selective ringing receiving device, however, has the following defect. The changing point for bit synchronization is uniquely set so that the ringing receiving device in a direct conversion system cannot make correct bit synchronization if the outputting frequency in a receiving station or the transmission frequency in a base station varies.

Such a defect is due to the following signal receiving format in the direct conversion system in the case where there is no fluctuation in the outputting frequency in a receiving station and the transmission frequency in a base station:

$$\text{the receiving frequency} = f_0 \pm \Delta f \quad (1)$$
$$\text{the frequency shift} = \Delta f \quad (2)$$
$$\text{the outputting frequency} = f_0 \quad (3)$$
$$\text{the audio frequency after mixing} = \Delta f \quad (4)$$
$$= \Delta f - f_{01} \quad (15)$$
$$= \Delta f + \Delta f_{01} \quad (16)$$

In the above receiving format, if a transmission speed is 1200 bps, a frequency shift is 4 KHz, and a frequency fluctuation $\Delta f_{01}$ is 1 KHz, the resolution for demodulation a '1010' signal will be 3 KHz ($\Delta f - \Delta f_{01}$) or 5 KHz ($\Delta f + \Delta f_{01}$).

If the changing point is detected at the fixed point of its rising and falling, the resolution of the changing point is fixed to either one of enhancement and attenuation in engagement with the resolution in demodulation. Therefore, if a frequency fluctuation occurs in the attenuation direction, the changing point detection circuit does not operate normally, thus making it unable to assure the bit synchronization.

SUMMARY OF THE INVENTION

An object of the present invention is to solve the above problem and to provide an excellent ringing receiving device which is not greatly influenced by the outputting frequency in a receiving station or the transmission frequency in a base station.

In order to attain the above object, in accordance with one aspect of the present invention, there is provided a selective ringing receiving circuit comprising a timing generating circuit for generating a timing signal for bit length comparison, a bit length comparison circuit for comparing, in terms of the timing signal, the respective bit lengths of '1' and '0' of a received digital signal outputted in a direct conversion system when a selective ringing signal is received from a base station, thereby producing a changing point detection/selection signal, a changing point detection circuit for selecting the rising and falling changing points of the received signal using the changing point detection/selection signal to produce a detected rising or falling changing point signal of the received digital signal, and a bit synchronization circuit for performing bit synchronization in response to the changing point detection signal inputted.

In accordance with the present invention, the bit length comparing circuit and the changing point detection circuit are provided so that even if the outputting frequency of the receiving station or the transmission frequency in the base station fluctuates, normal bit synchronization for the received digital signal can be made, thus minimizing the influence by the frequency fluctuation.

The above and other objects and features of the present invention will be more apparent from the following description taken in conjunction with the accompanying drawings.

DESCRIPTION OF THE PREFERRED EMBODIMENT

Figure 1:
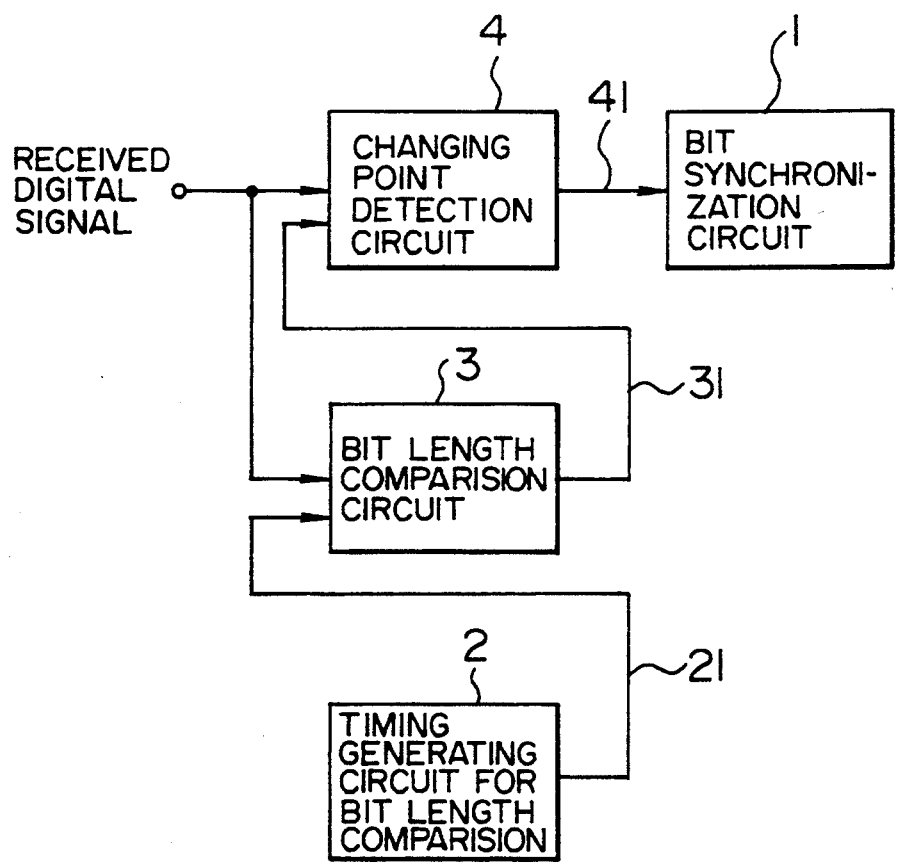
FIG. 1 is a schematic block diagram of a selective ringing receiving device according to one embodiment of the present invention.

Now referring to the drawings, one embodiment of the present invention will be explained.

FIG. 1 is a block diagram of a schematic arrangement of one embodiment of the present invention.

In FIG. 1, reference numeral 1 denotes the conventional bit synchronization. Reference numeral 2 denotes a timing generating circuit for bit length comparison which receives a selective ringing signal from a base station to generate a timing signal 21 for comparing the bit lengths of '1' and '0' of the received digital signal to be outputted as a digital signal in a direct conversion system, and has a window for detecting the changing point of the timing signal 21.

Reference numeral 3 denotes a bit length comparison circuit which compares the respective bit lengths '1' and '0' of the received digital signal by means of the changing point detecting window for the timing signal 21 outputted from the timing generating circuit for bit length comparison, thereby producing a changing point detection/selection signal 31.

Reference numeral 4 denotes a changing point detecting circuit which detects the rising or falling changing point of the received digital signal on the basis of the changing point detection selection signal 3 outputted from the bit length comparing circuit 3, thus supplying it as a changing detection signal 41 to the bit synchronization circuit 1.

The operation of this embodiment will be explained below. The selective ringing signal transmitted from a base station (not shown) received by a selective ringing receiving station and the ringing signal converted in a digital signal in a direct conversion system are inputted to the changing detection circuit 4 and the bit length comparison circuit 3.

Using the timing signal 21 sent from the timing generating circuit 21 for bit length comparison, the bit length comparison circuit 3 compares the bit lengths of '0' and '1' of the received digital signal to send a changing point detection selection signal 31 to the changing point detection circuit 4.

On the basis of the changing point detection selection signal 31, the changing point detection circuit 4 selectively detects the changing point of the received digital signal which is selected as a rising changing point or falling changing point, thus supplying a changing point detection signal 41 to the bit synchronization circuit 1.

Now if the transmission speed is 1200 bps, and the frequency shift is 4 KHz as a result of the comparison of the bit lengths of the received digital signal in terms of the timing signal 21 in the bit length comparison circuit 3, the resolution required for demodulating the '1010' signal is 4 KHz, regardless of detection of the rising changing point and the falling changing point.

On the other hand, if the outputting frequency of the receiving station or the transmission frequency in the base station fluctuates, the receiving format in the above equations (1) to (4) is as follows.

(A) where the outputting frequency in the receiving station fluctuates $$\text{the receiving frequency} = f_0 \pm \Delta f \quad (5)$$
$$\text{the frequency shift} = \Delta f \quad (6)$$
$$\text{the outputting frequency} = \Delta f_0 + \Delta f_{01} \quad (7)$$
$$\text{the audio frequency after mixing} = \Delta f - \Delta f_{01} \quad (8)$$
$$= \Delta f + \Delta f_{01} \quad (9)$$

(B) where the transmission frequency in the base station fluctuates $$\text{the receiving frequency} = f_0 + \Delta f_{01} \pm \Delta f \quad (10)$$
$$\text{the frequency shift} = \Delta f \quad (11)$$
$$\text{the outputting frequency} = \Delta f_0 \quad (12)$$
$$\text{the audio frequency after mixing} = \Delta f - \Delta f_{01} \quad (13)$$
$$= \Delta f + \Delta f_{01} \quad (14)$$

On the basis of these values, the changing point for bit synchronization for the digital signal is detected, and the changing point detection signal 41 is supplied to the bit synchronization circuit so that the bit synchronization is performed.

The bit synchronization uses the following feature of the demodulation in a direct conversion system.

FIGS. 2(a) to 2(d) are waveform charts for explaining the operation for frequency fluctuation in the demodulation in the direct conversion system.

Figure 2:
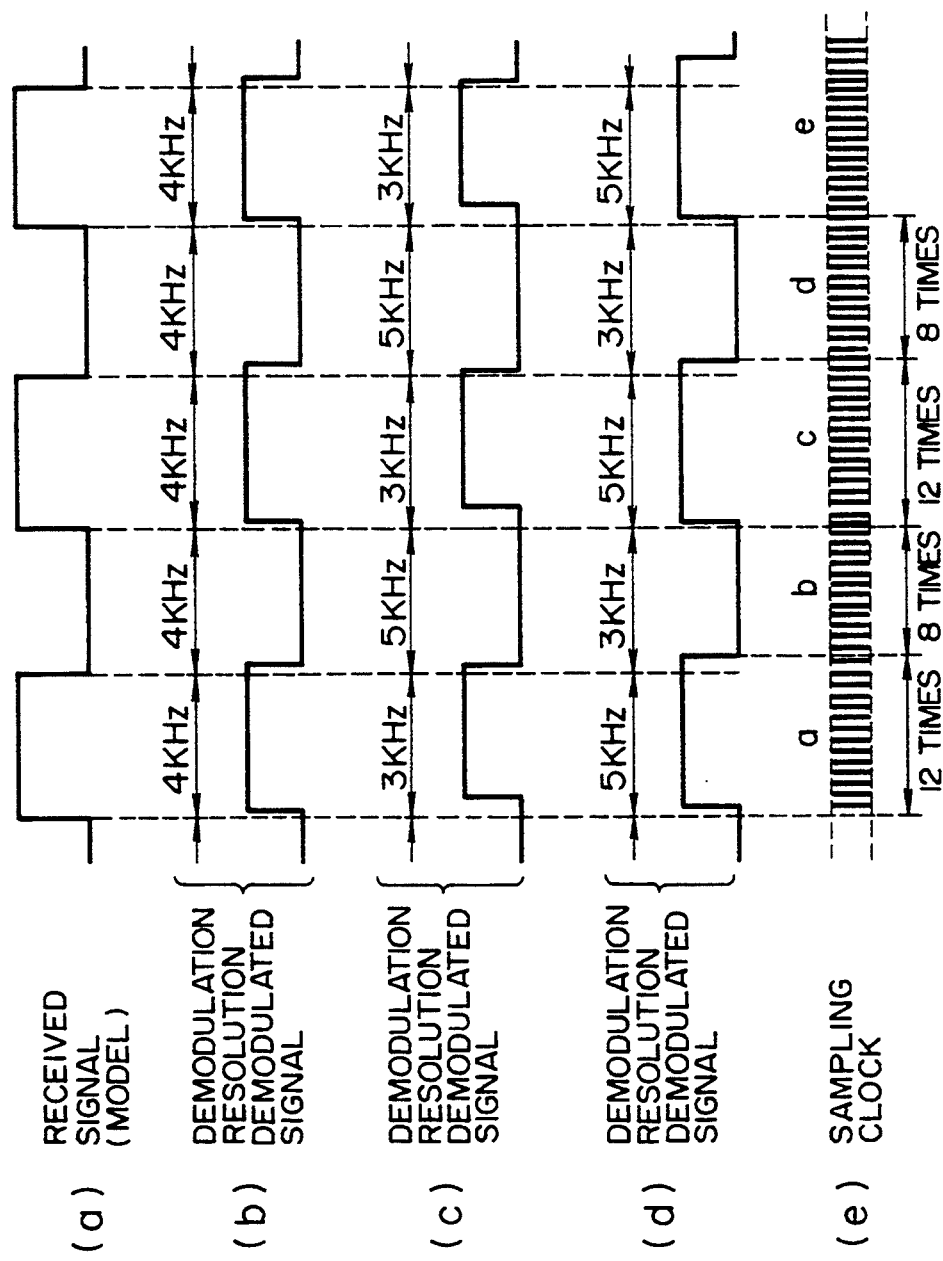
FIG. 2 is a waveform chart for explaining the operation dealing with frequency fluctuation in the modulation in a direct conversion system to which the above selective ringing receiving device is to applied.

As seen from FIG. 2(a), if the received signal includes no frequency fluctuation, the resolution required for demodulating '1' and '0' is 4 KHz, as shown in FIG. 2(b). Therefore, the resolution of the changing point after demodulation is also 4 KHz, so that ratio of the bit lengths of '1' and '0' is substantially equal.

On the other hand, as seen from FIGS. 2(c) and 2(d), if the frequency fluctuation occurs, the resolution required for demodulating '1' and '0' is 3 KHz or 5 KHz. In this case, the bit lengths of '1' and '0' becomes long as the resolution is high, so that the ratio of the bit lengths varies.

Using the feature of the above demodulation system that the bit length is long as the resolution is high, the bit lengths of '1' and '0' are compared. And the leading edge of the level with a longer bit length can be uniquely determined as the changing point for bit synchronization. In order to implement this, for example, the waveform as shown in FIG. 2(d) is sampled by the clock (FIG. 2(e)) at the frequency much higher than the received signal, and further the number of sampling within each of the intervals of '1' and is counted. By comparing the counted numbers, the edge for determining the changing point can be selected. Specifically, as seen from FIG. 2(e), the number of samplings during the periods a and c of '1' in the waveform in FIG. 2(d) is 14, which is greater than that during the periods b and d of '0' in the waveform in FIG. 2(d), so that it can decided that the period of '1' is longer. Thus, the rising edge which is the leading edge of '1' can be determined as the changing point for bit synchronization to receive the demodulated signal.

Figure 3:
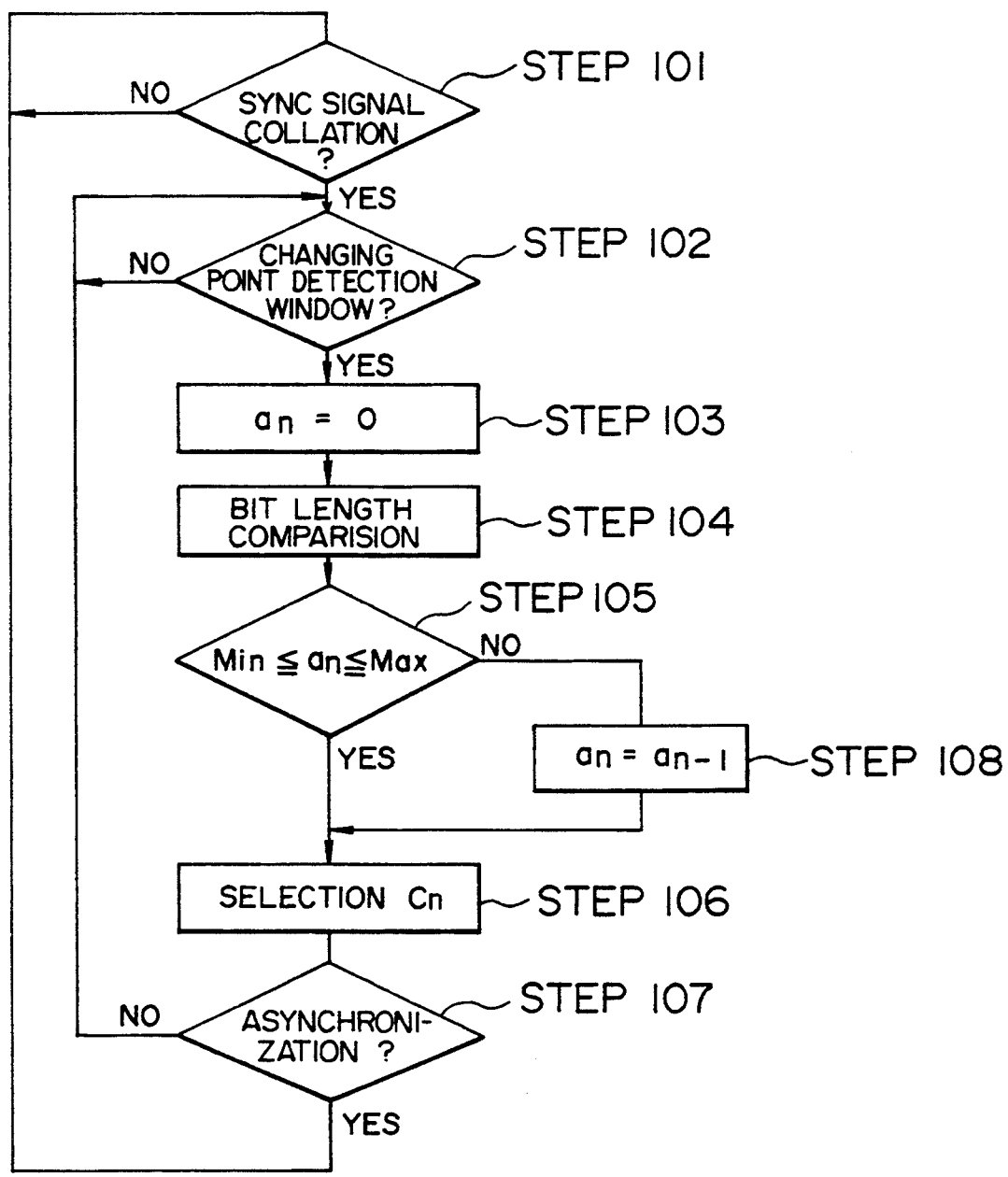
FIG. 3 is a flowchart for explaining the operation flow in the changing point detection circuit within the selective ringing receiving device.
Figure 4:
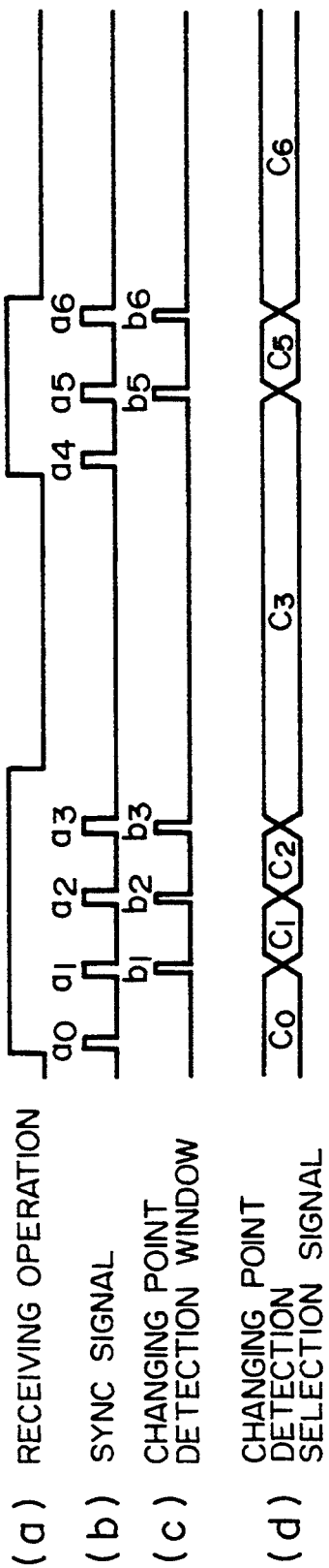
FIG. 4 is a conceptual timing chart of the changing point detection selecting operation in the changing point detection circuit.

FIG. 3 shows the operation flow of the detection/selection of a changing point by the chaning point detection circuit 4. FIG. 4 is a timing chart for explaining the operation of detection/selection selection of the changing point.

Now referring to FIGS. 3 and 4, the operation of the changing point detection circuit 4 will be explained in detail below.

The condition of starting the detection/selection of a changing point is sync signal collation in step 101 in FIG. 3. In step 102, the bit lengths of the sync signals $a_l$ to $a_n$ received after the sync signal $a_0$ initially collated during the reception operation as shown in FIG. 4(a) are compared during the periods of the timing signal 21 obtained from the changing point detection windows (FIG. 4(c)) of the timing generating circuit 2 for bit length comparison thereby to produce the changing point detection/selection signal 31 ($c_1$ to $c_n$) as shown in FIG. 4(d). Thus, the received digital signal is subjected to the bit synchronization.

The initial value in the bit length comparison circuit 3 is $a_n=0$ (step 103). The bit length is compared with this initial value in step 104. In step 105, up/down clocks corresponding to '1' and '0' in the received digital signal during the period of the changing point window $b_n$ are inputted. In step 106, the changing point detection/selection circuit $c_n$ is outputted. In step 107, synchronization of the changing point detection signal 41 is taken by the bit synchronization circuit 1. In the case of an asynchronous state, the processing is returned to step 101, whereas in the case of a synchronous state, the processing is returned to step 102.

Further, in step 105, the condition Min$\leq a \leq$Max is added as the condition for determining the changing point detection/selection signal. If this condition is not satisfied, the processing is branched from step 105 into step 108. Then, the changing point detection/selection signal $c_n$ is set for $c_n=c_{n-1}$ and the bit length $a=a_{n-1}$ to obviate poor reception (temporary poor reception).

In this way, in accordance with this embodiment, the bit lengths of the received digital signal are compared in terms of the timing signal 21 in the bit length comparison circuit 3 to produce the changing point detection/selection signal 3, and the changing point of the received digital signal is set for the rising changing point or the falling changing point using the changing point detection/selection signal 3 in the changing point detection circuit 4. Thus, even if the outputting frequency of the receiving station or the transmission frequency in the base station fluctuates, normal bit synchronization for the received digital signal can be made, thus minimizing the influence by the frequency fluctuation.

A selective ringing receiving circuit according to the present invention comprises a timing generating circuit for generating a timing signal for bit length comparison, a bit length comparison circuit for comparing, using the timing signal, the respective bit lengths of '1' and '0' of a received digital signal outputted in a direct conversion system when a selective ringing signal is received from a base stations thereby producing a changing point detection selection signal, a changing point detection circuit for selecting the rising and falling changing points of the received signal using the changing point detection selecting signal to produce the rising or falling changing point detection signal of the received digital signal, and a bit synchronization circuit for performing bit synchronization in response to the changing point detection signal inputted.

In accordance with the present invention, the bit length comparison circuit and the changing point detection circuit are provided so that even if the outputting frequency of the receiving station or the transmission frequency in the base station fluctuates, normal bit synchronization for the received digital signal can be made, thus minimizing the influence by the frequency fluctuation.

I claim:

1. A selective ringing receiving circuit comprising:
   receiving means for receiving a digital signal to output a received digital signal which has rising and falling changing points;
   a timing generating circuit for generating a timing signal for bit length comparison;
   a bit length comparison circuit for comparing, in terms of said timing signal, respective bit lengths of '1' and '0' bits of the received digital signal outputted from said receiving means and for producing a changing point detection signal in accordance with a result of a comparison of said respective bit lengths;
   a changing point detection circuit for selecting either the rising changing points or the falling changing points of said received digital signal in accordance with the changing point detection signal to produce a detected rising or falling changing point signal of the received digital signal; and
   a bit synchronization circuit for performing bit synchronization in response to the detected rising or falling changing point signal.

2. A selective ringing receiving circuit according to claim 1, wherein said digital signal received by said receiving means is a selective receiving signal from a base station an a direct conversion system.

3. A selective ringing receiving circuit according to claim 1, wherein said bit length comparison circuit uses said timing signal as a sampling clock signal to obtain samples of said received digital signal and compares said respective bit lengths by comparing a number of said samples obtained from one of said '1' bits to a number of said samples obtained from one of said '0' bits.

4. A selective ringing receiving circuit according to claim 1, wherein said changing point detection circuit selects said rising changing points of said received digital signal when said bit length comparison circuit determines that said '1' bits are longer than said '0' bits, and wherein said changing point detection circuit selects said falling changing points of said received digital signal when said bit length comparison circuit determines that said '0' bits are longer than said '1' bits.

5. A method for receiving a selective ringing signal, said method comprising the steps of:
   (a) receiving a digital signal;
   (b) comparing bit lengths of '1' and '0' bits of the digital signal;
   (c) detecting and producing a changing point signal in synchronism with one of said '1' and '0' bits with a longer bit length; and
   (d) adjusting bit synchronization using the changing point signal.

6. A method for receiving a selective ringing signal according to claim 5, wherein step (b) comprises measuring said digital signal at times determined by a plurality of sync signals to determine said bit lengths, and wherein, when one of the bit lengths as measured at a time of one of said plurality of sync signals is outside a predetermined range, said changing point signal is determined with respect to a previous one of said plurality of sync signals.

7. A method for receiving a selective ringing signal according to claim 5, wherein said digital signal received in step (a) is a selective ringing signal from a base station in a direct conversion system.

8. A method for receiving a selective ringing signal according to claim 5, wherein step (b) comprises comparing said bit lengths to a period of a timing signal obtained from a changing point detection window of a timing generating circuit.

9. A method for receiving a selective ringing signal according to claim 5, wherein step (c) comprises producing said changing point signal in synchronism with a leading edge of said one of said '1' and '0' bits with said longer bit length.

* * * * *